US008324310B2

(12) United States Patent
Robert et al.

(10) Patent No.: US 8,324,310 B2
(45) Date of Patent: Dec. 4, 2012

(54) PLASTICIZING SYSTEM FOR A RUBBER COMPOSITION

(75) Inventors: Pierre Robert, Greer, SC (US); Stéphanie De Landtsheer, Clermont-Ferrand (FR); Jean-Michel Favrot, Coumon-D'Auvergne (FR); Garance Lopitaux, Valignat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/990,288

(22) PCT Filed: Jul. 18, 2006

(86) PCT No.: PCT/EP2006/007056
§ 371 (c)(1),
(2), (4) Date: Jul. 16, 2009

(87) PCT Pub. No.: WO2007/017060
PCT Pub. Date: Feb. 15, 2007

(65) Prior Publication Data
US 2009/0292063 A1 Nov. 26, 2009

(30) Foreign Application Priority Data
Aug. 8, 2005 (FR) ...................... 05 08502

(51) Int. Cl.
*B60C 1/00* (2006.01)
*C08L 45/00* (2006.01)
*C08L 55/00* (2006.01)

(52) U.S. Cl. .......... 524/518; 524/474; 524/68; 524/577; 524/578; 526/335

(58) Field of Classification Search .................. 524/518, 524/474, 68, 577, 578; 526/335
See application file for complete search history.

(56) References Cited

U.S. PATENT DOCUMENTS

| 7,329,704 | B2 * | 2/2008 | Labauze | 524/474 |
| 7,834,074 | B2 * | 11/2010 | Brunelet et al. | 524/318 |
| 2004/0127617 | A1 * | 7/2004 | Vasseur et al. | 524/318 |
| 2006/0116457 | A1 * | 6/2006 | Cambon et al. | 524/261 |
| 2008/0009564 | A1 * | 1/2008 | Robert et al. | 523/351 |
| 2008/0156404 | A1 * | 7/2008 | Brunelet et al. | 152/209.1 |

FOREIGN PATENT DOCUMENTS

| EP | 1 077 223 | 2/2001 |
| EP | 1 270 657 | 1/2003 |
| WO | WO2004/022644 | 3/2004 |
| WO | WO2005087859 | * 9/2005 |

* cited by examiner

*Primary Examiner* — James J Seidleck
*Assistant Examiner* — Deve E Valdez
(74) *Attorney, Agent, or Firm* — Cozen O'Connor

(57) ABSTRACT

Plasticizing system which can be used for the plasticizing of a diene rubber composition, wherein it is based on an MES or TDAE oil and on a resin formed of terpene/vinylaromatic copolymer, in particular copolymer of limonene and of stirene. Rubber composition exhibiting an improved abrasion and cut resistance, the composition being based on at least a diene elastomer, a reinforcing filler, a crosslinking system and a plasticizing system comprising between 5 and 35 phr of an MES or TDAE oil and between 5 and 35 phr of such a resin formed of terpene/vinylaromatic copolymer (pce=parts by weight per hundred parts of elastomer). Process for preparing such a composition, use of the composition for the manufacture of a finished article or of a semi-finished product intended for a tire or a tire/motor vehicle connecting system, in particular a tire tread.

19 Claims, No Drawings

PLASTICIZING SYSTEM FOR A RUBBER COMPOSITION

RELATED APPLICATION

This is a U.S. National Phase Application under 35 USC 371 of International Application PCT/EP2006/007056, filed on Jul. 18, 2006.

This application claims the priority of French patent application no. 05/08502 filed Aug. 8, 2005.

FIELD OF THE INVENTION

The present invention relates to rubber compositions intended in particular for the manufacture of tires or semi-finished products for tires. It relates more particularly to the plasticizing systems which can be used for plasticizing such compositions.

BACKGROUND OF THE INVENTION

Rubber compositions for tires comprise, in a known way, plasticizing agents used for the preparation or synthesis of certain diene elastomers, for improving the processability of the said compositions in the raw state and some of their use properties in the cured state, such as, for example, in the case of tire treads, their grip on wet ground or also their abrasion and cut resistance.

For a very long time, it has essentially been oils derived from petroleum and which are highly aromatic, known under the name of DAE ("Distillate Aromatic Extracts") oils, which have been used to perform this function of plasticizing agent. Many tire manufacturers are today, for environmental reasons, envisaging gradually replacing these DAE oils by substitute oils of the "nonaromatic" type, in particular by "MES" ("Medium Extracted Solvates") or "TDAE" ("Treated Distillate Aromatic Extracts") oils which are characterized by a very low level of polyaromatics (approximately 20 to 50 times less).

The Applicants have noted that the replacement, in tire rubber compositions, of DAE aromatic oils by these MES or TDAE oils is unexpectedly reflected by a reduction in the abrasion and cut resistance of the said compositions, it being possible for this reduction to be even totally unacceptable in certain applications, in particular with regard to the problem of chipping of tire treads.

"Chipping" (or "scaling") is a known damaging mechanism which corresponds to lamellar surface pieces, in the form of scales, being torn off from the constituent "rubber" (or rubber composition) of the treads under certain aggressive running conditions. This problem is encountered in particular with regard to tires for off-road vehicles or vehicles found on construction or civil engineering sites, which have to run over different types of soils, some of them stony and relatively aggressive; it has, for example, been described, along with some solutions for overcoming it, in the patent documents EP-A-0 030 579 (or AU-A-6429780) and FR-A-2 080 661 (or GB-A-1 343 487).

SUMMARY OF THE INVENTION

On continuing their research, the Applicants have discovered that the replacement of a portion of these MES or TDAE oils by another specific plasticizing agent makes it possible not only to solve the above problem but, which is even more surprising, to also improve the abrasion and cut resistance of the rubber compositions using conventional aromatic oils as plasticizing agent.

Consequently, a first subject-matter of the invention is a rubber composition based on at least a diene elastomer, a reinforcing filler, a plasticizing system and a crosslinking system, characterized in that the said plasticizing system comprises (phr=parts by weight per hundred parts of elastomer):

between 5 and 35 phr of an MES or TDAE oil;
between 5 and 35 phr of terpene/vinylaromatic copolymer resin.

Another subject-matter of the invention is a process for preparing a rubber composition having an improved abrasion and cut resistance, this composition being based on a diene elastomer, a reinforcing filler, a plasticizing system and a crosslinking system, the said process comprising the following stages:

incorporating in a diene elastomer, during a first referred to as "non-productive" stage, at least a reinforcing filler and a plasticizing system, by kneading thermomechanically the whole, in one or more goes, until a maximum temperature of between 110° C. and 190° C. is reached;
cooling the entire mixture to a temperature of less than 100° C.;
subsequently incorporating, during a second referred to as "productive" stage, the crosslinking system;
kneading everything until a maximum temperature of less than 110° C. is reached,
and being characterized in that the said plasticizing system comprises:
between 5 and 35 phr of an MES or TDAE oil;
between 5 and 35 phr of terpene/vinylaromatic copolymer resin.

An aspect of the invention relates to a plasticizing system which can be used for the plasticizing of a diene rubber composition, the said system comprising, in combination, an MES or TDAE oil and a terpene/vinylaromatic copolymer resin, and to the use of such a system for the plasticizing of a diene rubber composition.

Another subject-matter of the invention is the use of a composition according to the invention for the manufacture of a finished article or of a semi-finished product made of rubber intended for any tire or tire/motor vehicle connecting system, such as tire internal safety support for a tire, wheel, rubber spring, elastomeric joint, other suspension element and vibration damper.

A particular subject-matter of the invention is the use of a composition according to the invention for the manufacture of tires or semi-finished products made of rubber intended for these tires, these semi-finished products preferably being chosen from the group consisting of treads, crown reinforcing plies, sidewalls, carcass reinforcement plies, beads, protectors, underlayers, rubber blocks and other internal rubbers, in particular decoupling rubbers, intended to provide the bonding or the interface between the abovementioned regions of the tires.

A more particular subject-matter of the invention is the use of a composition according to the invention for the manufacture of a tire tread exhibiting an improved cut and chipping resistance.

Another subject-matter of the invention is the finished articles and semi-finished products made of rubber themselves, in particular tires and semi-finished products for tires, when they comprise an elastomeric composition in accordance with the invention. The tires in accordance with the invention are intended in particular for passenger vehicles, such as two-wheel vehicles (motor cycles, bicycles), industrial vehicles chosen from vans, heavy-duty vehicles—i.e. underground, bus, heavy road transport vehicles (lorries, tractors, trailers) or off-road vehicles—, heavy agricultural vehicles or earthmoving equipment, planes, and other transportation or handling vehicles.

The invention and its advantages will be more easily understood in the light of the detailed description and of the exemplary embodiments which follow.

DETAILED DESCRIPTION

The rubber composition according to an embodiment of the invention, which can be used in particular for the manufacture of a tire or of a tire tread, is based on at least a diene elastomer, a reinforcing filler, a crosslinking system and a specific plasticizing system.

The expression composition "based on" is to be understood as meaning a composition comprising the mixture and/or the reaction product of the various constituents used, some of these base constituents being liable to, or intended to react together, at least in part, during the various phases of manufacture of the composition, in particular during its crosslinking or vulcanization.

In the present description, unless expressly indicated otherwise, all the percentages (%) indicated are % by weight.
Diene Elastomer The term "diene" elastomer or rubber should be understood as meaning, in a known way, an (one or more are understood) elastomer resulting at least in part (i.e., homopolymer or a copolymer) from diene monomers (monomers carrying two carbon-carbon double bonds which may or may not be conjugated).

These diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term diene elastomer capable of being used in the compositions in accordance with the invention is understood more particularly to mean:
(a) —any homopolymer obtained by polymerization of a conjugated diene monomer having from 4 to 12 carbon atoms;
(b) —any copolymer obtained by copolymerization of one or more conjugated dienes with one another or with one or more vinylaromatic compounds having from 8 to 20 carbon atoms;
(c) —a ternary copolymer obtained by copolymerization of ethylene and of an α-olefin having 3 to 6 carbon atoms with a nonconjugated diene monomer having from 6 to 12 carbon atoms, such as, for example, the elastomers obtained from ethylene and propylene with a nonconjugated diene monomer of the abovementioned type, such as, in particular, 1,4-hexadiene, ethylidenenorbornene or dicyclopentadiene;
(d) —a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystirenes, chlorostirenes, vinylmesitylene, divinylbenzene or vinylnaphthalene.

The copolymers may contain between 99% and 20% by weight of diene units and between 1% and 80% by weight of vinylaromatic units. The elastomers may have any microstructure which depends on the polymerization conditions used, in particular on the presence or absence of a modifying and/or randomizing agent and on the amounts of modifying and/or randomizing agent employed. The elastomers may, for example, be block, random, sequential or microsequential blocks and can be prepared in dispersion or in solution; they may be coupled and/or star-branched or also functionalized with a coupling and/or star-branching or functionalization agent.

The following are suitable: polybutadienes, in particular those having a content of 1,2-units of between 4% and 80% or those having a content of cis-1,4-units of greater than 80%, polyisoprenes, butadiene/stirene copolymers and in particular those having a stirene content of between 5% and 50% by weight and more particularly between 20% and 40%, a content of 1,2-bonds of the butadiene part of between 4% and 65% and a content of trans-1,4-bonds of between 20% and 80%, butadiene/isoprene copolymers, in particular those having an isoprene content of between 5% and 90% by weight and a glass transition temperature (Tg, measured according to ASTM D3418) of −40° C. to −80° C., or isoprene/stirene copolymers, in particular those having a stirene content of between 5% and 50% by weight and a Tg of between −25° C. and −50° C. In the case of butadiene/stirene/isoprene copolymers, those having a stirene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content of 1,2-units of the butadiene part of between 4% and 85%, a content of trans-1,4-units of the butadiene part of between 6% and 80%, a content of 1,2-plus 3,4-units of the isoprene part of between 5% and 70% and a content of trans-1,4-units of the isoprene part of between 10% and 50%, and more generally any butadiene/stirene/isoprene copolymer having a Tg of between −20° C. and −70° C., are suitable in particular.

To sum up, the diene elastomer of the composition according to the invention is preferably chosen from the group of the highly unsaturated diene elastomers consisting of polybutadienes (abbreviated to "BR"), polyisoprenes (IR), natural rubber (NR), butadiene copolymers, isoprene copolymers and the blends of these elastomers. Such copolymers are more preferably chosen from the group consisting of butadiene/stirene copolymers (SBR), isoprene/butadiene copolymers (BIR), isoprene/stirene copolymers (SIR) and isoprene/butadiene/stirene copolymers (SBIR).

According to a specific embodiment, the diene elastomer is majoritarily (that is to say, for more than 50 phr) an SBR, whether an SBR prepared in emulsion ("E-SBR") or an SBR prepared in solution ("S-SBR"), or an SBR/BR, SBR/NR (or SBR/IR) or also BR/NR (or BR/IR) blend. In the case of an SBR elastomer, use is made in particular of an SBR having a stirene content of between 20% and 30% by weight, a content of vinyl bonds of the butadiene part of between 15% and 65%, a content of trans-1,4-bonds of between 15% and 75% and a Tg of between −20° C. and −55° C.; such an SBR may advantageously be used as a blend with a BR preferably having more than 90% of cis-1,4-bonds.

According to another specific embodiment, the diene elastomer is majoritarily (for more than 50 phr) an isoprene elastomer. This is the case in particular when the compositions of the invention are intended to constitute, in the tires, rubber matrices of certain treads (for example for industrial vehicles), of crown reinforcement plies (for example of working plies, protection plies or hooping plies), of carcass reinforcement plies, of sidewalls, of beads, of protectors, of underlayers, of rubber blocks and other internal rubbers providing the interface between the abovementioned regions of the tires.

The term "isoprene elastomer" is understood to mean, in a known way, an isoprene homopolymer or copolymer, in other words a diene elastomer chosen from the group consisting of natural rubber (NR), synthetic polyisoprenes (IR), the various copolymers of isoprene and the blends of these elastomers. Mention will in particular be made, among isoprene copolymers, of isobutene/isoprene copolymers (butyl rubber—IIR), isoprene/stirene copolymers (SIR), isoprene/butadiene copolymers (BIR) or isoprene/butadiene/stirene copolymers (SBIR). This isoprene elastomer is preferably natural rubber or a synthetic cis-1,4-polyisoprene; use is preferably made, among these synthetic polyisoprenes, of the polyisoprenes having a level (mol %) of cis-1,4-bonds of greater than 90%, more preferably still of greater than 98%.

According to another specific embodiment, in particular when it is intended for a tire sidewall or for an airtight internal rubber of a tubeless tire (or other air-impermeable component), the composition in accordance with the invention may contain at least one essentially saturated diene elastomer, in particular at least one EPDM copolymer or one butyl rubber (optionally chlorinated or brominated), whether these copolymers are used alone or as a blend with highly unsaturated diene elastomers as mentioned above, in particular NR or IR, BR or SBR.

According to another preferred embodiment of the invention, the rubber composition comprises a blend of a (one or more) "high Tg" diene elastomer exhibiting a Tg of between −65° C. and −10° C. and of a (one or more) "low Tg" diene elastomer exhibiting a Tg of between −110° C. and −80° C., more preferably between −105° C. and −90° C. The high Tg elastomer is preferably chosen from the group consisting of S-SBRs, E-SBRs, natural rubber, synthetic polyisoprenes (exhibiting a level of cis-1,4-structures preferably of greater than 95%), BIRs, SIRs, SBIRs and the blends of these elastomers. The low Tg elastomer preferably comprises butadiene units according to a level at least equal to 70%; it preferably consists of a polybutadiene (BR) exhibiting a level of cis-1,4-structures of greater than 90%.

According to a specific embodiment of the invention, the rubber composition comprises, for example, from 40 to 100 phr, in particular from 50 to 100 phr, of a high Tg elastomer as a blend with 0 to 60 phr, in particular from 0 to 50 phr, of a low Tg elastomer, for example 100 phr of one or more copolymers of stirene and of butadiene prepared in solution.

According to another specific embodiment of the invention, the diene elastomer of the composition according to the invention comprises a blend of a BR (as low Tg elastomer) exhibiting a level of cis-1,4-structures of greater than 90% with an S-SBR or an E-SBR (as high Tg elastomer).

The compositions of the invention may comprise a single diene elastomer or a blend of several diene elastomers, it being possible for the diene elastomer or elastomers to be used in combination with any type of synthetic elastomer other than a diene elastomer, or even with polymers other than elastomers, for example thermoplastic polymers.

Reinforcing Filler

Use may be made of any type of reinforcing filler known for its capabilities of reinforcing a rubber composition which can be used for the manufacture of tires, for example an organic filler, such as carbon black, or a reinforcing inorganic filler, such as silica, with which a coupling agent is associated.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772).

The term "reinforcing inorganic filler" is to be understood, in the present patent application, by definition, as meaning any inorganic or mineral filler, whatever its colour and its origin (natural or synthetic), also known as "white" filler, "clear" filler or even "non-black filler", in contrast to carbon black, capable of reinforcing, by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used may be any reinforcing silica known to a person skilled in the art, in particular any precipitated or pyrogenic silica exhibiting a BET surface and a CTAB specific surface both of less than 450 $m^2/g$, preferably from 30 to 400 $m^2/g$. Mention will be made, as highly dispersible ("HD") precipitated silicas, for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface as disclosed in Application WO 03/16387. Mention may be made, as examples of reinforcing aluminas, of the "Baikalox" "A125" or "CR125" aluminas from Baïkowski, the "APA-100RDX" alumina from Condea, the "Aluminoxid C" alumina from Degussa or the "AKP-G015" alumina from Sumitomo Chemicals.

Mention may also be made, as other examples of inorganic filler capable of being used, of reinforcing aluminium (oxide) hydroxides, titanium oxides or silicon carbides (see, for example, Application WO 02/053634 or US 2004/030017).

When the compositions of the invention are intended for tire treads with a low rolling resistance, the reinforcing inorganic filler used, in particular if it is silica, preferably has a BET surface of between 45 and 400 m²/g, more preferably of between 60 and 300 m²/g.

Preferably, the level of total reinforcing filler (carbon black and/or reinforcing inorganic filler) is between 20 and 200 phr, more preferably between 30 and 150 phr, the optimum being in a known way different depending on the specific applications targeted: the level of reinforcement expected with regard to a bicycle tire, for example, is, of course, less than that required with regard to a tire capable of running at high speed in a sustained manner, for example a motor cycle tire, a tire for a passenger vehicle or a tire for a utility vehicle, such as a heavy-duty vehicle.

For coupling the reinforcing inorganic filler to the diene elastomer, use is made, in a known way, of an at least bifunctional coupling agent (or bonding agent) intended to provide a sufficient connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "asymmetrical" depending on their specific structure, as disclosed, for example, in Applications WO03/002648 (or US 2005/016651) and WO03/002649 (or US 2005/016650).

Particularly suitable, without the definition below being limitative, are what are called "symmetrical" polysulphurised silanes which satisfy the following general formula (I):

$$Z\text{-}A\text{-}S_n\text{-}A\text{-}Z, \text{ in which:} \quad (I)$$

n is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

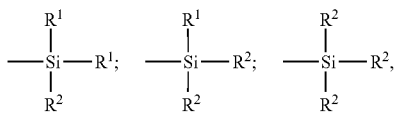

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (I), in particular the usual mixtures available commercially, the mean value of the "n" index is a fractional number preferably of between 2 and 5, more preferably in the vicinity of 4. However, the invention can also advantageously be carried out, for example, with alkoxysilane disulphides (n=2).

Mention will more particularly be made, as examples of silane polysulphides, of bis(($C_1$-$C_4$)alkoxyl($C_1$-$C_4$)alkyl-silyl-($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl) tetrasulphide, abbreviated to TESPT, of formula $[(C_2H_5O)_3Si(CH_2)_3S_2]_2$, or bis (triethoxysilylpropyl) disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$) alkylsilylpropyl) polysulphides, (in particular disulphides, trisulphides or tetrasulphides), more particularly bis(monoethoxydimethylsilylpropyl) tetrasulphide, as disclosed in Patent Application WO 02/083782 (or US 2004/132880).

Mention will in particular be made, as coupling agent other than alkoxysilane polysulphide, of bifunctional POSs (polyorganosiloxanes) or of hydroxysilane polysulphides ($R^2$=OH in the above formula I), such as disclosed in Patent Applications WO 02/30939 (or U.S. Pat. No. 6,774,255) and WO 02/31041 (or US 2004/051210).

In the rubber compositions in accordance with the invention, the content of coupling agent is preferably between 4 and 12 phr, more preferably between 3 and 8 phr.

The coupling agent could be grafted beforehand to the diene elastomer or to the reinforcing inorganic filler. However, it is preferable, in particular for reasons of better processing of the compositions in the raw state, to use the coupling agent either grafted to the reinforcing inorganic filler or in the free state (i.e., nongrafted).

Plasticizing System

The rubber compositions of the invention therefore have the essential characteristic of using the plasticizing system comprising at least:
between 5 and 35 phr of an MES or TDAE oil;
between 5 and 35 phr of a resin formed of a copolymer of at least a terpene monomer and of at least a vinylaromatic monomer.

MES and TDAE oils are well known to a person skilled in the art; for example, reference will be made to the recent publication KGK (Kautschuk Gummi Kunstoffe), 52nd year, No. 12/99, pp. 799-805, entitled "*Safe Process Oils for Tires with Low Environmental Impact*". Patent applications disclosing the use of such oils, as a substitute for conventional aromatic oils, are, for example, EP-A-1 179 560 (or US2002/0045697) or EP-A-1 270 657.

Mention may be made, as examples of MES oils (whether they are of the "extracted" or "hydrotreated" type) or of TDAE oils, for example, of the products sold under the names "Flexon 683" by ExxonMobil, "Vivatec 200" or "Vivatec 500" by H&R European, "Plaxolene MS" by Total, or "Catenex SNR" by Shell.

The resins (it should be remembered that the term "resin" is reserved by definition for a starting compound which is solid at ambient temperature) formed of terpene/vinylaromatic copolymer, in particular of terpene/stirene copolymer, are well known; they have been essentially used to date for application as adhesive agents (tackifiers) in the food industry or as plasticizers or processing aids in tire rubber compositions.

Stirene, ortho-, meta- or para-methylstirene, vinyltoluene, para-(tert-butyl)stirene, methoxystirenes, chlorostirenes, vinylmesitylene, divinylbenzene and vinylnaphthalene, for example, are suitable as vinylaromatic monomers. Preferably, the vinylaromatic compound is styrene.

The term "terpene" combines here, in a known way, the monomers α-pinene, β-pinene and limonene. Use is preferably made of a limonene monomer, limonene existing, in a known way, in the form of three possible isomers: L-limonene (laevorotatory enantiomer), D-limonene (dextrorotatory enantiomer) or else dipentene, the racemate of the dextrorotatory and laevorotatory enantiomers.

Mention may be made, as examples of resins formed of limonene/stirene copolymer which are commercially available, for example, of the products "Dercolyte TS 105" from DRT and "ZT115LT" and "ZT5100" from Arizona Chemical Company.

Such resins can also be prepared according to known polymerization processes, for example as follows: a reactor is charged with 1380 ml of toluene and 6 g of aluminium trichloride (Aldrich product, purity=99%). The suspension is brought to 25° C. A mixture of monomers composed of 196 g of stirene and 204 g of limonene (or 4-isopropenyl-1-methyl-1-cyclohexene; Fluka product; purity ≧99%) is added dropwise to the suspension over 5 min. The temperature of the reaction mixture increases to 58° C. After polymerizing for 15 min, the reaction is halted with 250 ml of deionized water. The organic phase is recovered. An antioxidant (for example 1.6 g of 2,2'-methylenebis(4-methyl-6-(tert-butyl)phenol) can be added to the resin in solution. Most of the toluene is removed on a rotary evaporator at 70° C. under reduced pressure. The final product is obtained after drying in an oven at 200° C. under reduced pressure. A resin formed of limonene/stirene copolymer (Tg=52° C.; Mn=720; Ip=1.4) is thus obtained in the form of a material which is beige in colour and which is hard, brittle and friable at ambient temperature, with complete conversion of the monomers (99 to 100%, by gas chromatography).

The level of resin formed of terpene/vinylaromatic copolymer has to be between 5 and 35 phr. Below the minimum indicated, the targeted technical effect is inadequate while, above 35 phr, the tackiness of the compositions in the raw state, with regard to the mixing devices, becomes totally unacceptable from the industrial viewpoint. For this reason, this level of resin is preferably between 5 and 25 phr, more preferably between 5 and 20 phr.

That of the MES or TDAE oil is preferably between 10 and 30 phr, more preferably between 10 and 25 phr, while the total plasticising system level of the invention, comprising the MES and/or TDAE oil and the resin, is preferably between 15 and 45 phr, more preferably between 20 and 40 phr.

The resin formed of terpene/vinylaromatic copolymer, in particular of terpene/stirene copolymer, exhibits at least one (more preferably all) of the following preferred characteristics:

- a Tg of greater than 25° C. (more particularly of greater than 30° C.);
- a number-average molecular weight (Mn) of between 400 and 2000 g/mol;
- a index of polymolecularity (Ip) of less than 3 (reminder: IP=Mw/Mn with Mw the weight-average molecular weight);
- a level of units derived from terpene monomer (in particular limonene) and a level of units derived from vinylaromatic monomer (in particular stirene) which are each between 5% and 95% (more particularly each between 10% and 90%).

More preferably still, this resin exhibits at least one (more preferably all) of the following preferred characteristics:

- a Tg of between 30° C. and 80° C. (more particularly between 35° C. and 60° C.);
- a molecular weight Mn of between 600 and 1500 g/mol;
- a polymolecularity index Pi of less than 2.5;
- a level of units derived from vinylaromatic monomer (in particular stirene) of greater than 40% (more particular of between 40% and 90%).

The glass transition temperature Tg is measured in a known way by DSC (Differential Scanning Calorimetry) according to Standard ASTM D3418 (1999).

The macrostructure (Mw, Mn and Ip) of the terpene/vinylaromatic copolymer is determined by steric exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standard; set of 3 "Waters" columns in series ("Styragel" HR4E, HR1 and HR0.5); detection by differential refractometer ("Waters 2410") and its associated operating software ("Waters empower").

According to a preferred embodiment of the invention, in particular when the composition of the invention is intended for a tire tread, the plasticizing system of the invention additionally comprises between 5 and 35 phr (more generally between 10 and 30 phr) of a glycerol unsaturated ($C_{12}$-$C_{22}$) fatty acid triester, in particular a glycerol trioleate (derived from oleic acid and glycerol), for example present in the form of a sunflower or rapeseed vegetable oil. Such a triester makes it possible to minimize, in the said tread, on the one hand, the exsudation of the total plasticizing system by compression under rolling and, on the other hand, the migration of the said plasticizer towards mixes adjacent to the tread. This is reflected by a settling and a hardening which are also minimized for the tread and, consequently, by the retention over time of the grip performance. In such a case, preferably, the fatty acid (or the combination of fatty acids, if several are present) comprises oleic acid according to a fraction by weight at least equal to 60%.

When the plasticizing system of the invention comprises such a glycerol fatty acid triester in addition to the MES or TDAE oil and the resin formed of terpene/vinylaromatic copolymer, the overall level of plasticizing system in the rubber composition of the invention is preferably between 20 and 70 phr, more preferably between 30 and 60 phr.

The plasticizing system of the invention might also comprise other nonaromatic or very slightly aromatic plasticizing agents, for example naphthenic or paraffinic oils, or other plasticizing hydrocarbon resins exhibiting a high Tg preferably of greater than 25° C., in combination with the terpene/vinylaromatic copolymer resin and the MES or TDAE oil which are described above.

Various Additives

The rubber compositions in accordance with the invention also comprise all or a some of the usual additives generally used in elastomer compositions intended for the manufacture of tires, in particular treads, such as, for example, pigments, protection agents, such as antiozone waxes, chemical antiozonants, antioxidants, antifatigue agents, reinforcing resins, methylene acceptors (for example, phenolic novolak resin) or methylene donors (for example HMT or H3M), as disclosed, for example, in Application WO 02/10269 (or US 2003/212185), a crosslinking system based either on sulphur or on sulphur donors and/or on peroxide and/or on bismaleimides, vulcanization accelerators or vulcanization activators.

These compositions can also comprise, in addition to coupling agents, coupling activators, agents for covering the inorganic fillers or more generally processing aids capable, in a known way, by virtue of an improvement in the dispersion of the filler in the rubber matrix and of a lowering in the viscosity of the compositions, of improving their processing property in the raw state, these agents being, for example, hydrolyzable silanes, such as alkylalkoxysilanes, polyols, polyethers, primary, secondary or tertiary amines or hydroxylated or hydrolyzable polyorganosiloxanes.

Preparation of the Rubber Compositions

The compositions are manufactured in appropriate mixers using two successive preparation phases well known to a person skilled in the art: a first phase of thermomechanical working or kneading (referred to as "non-productive" phase) at high temperature, up to a maximum temperature of between 110° C. and 190° C., preferably between 130° C. and 180° C., followed by a second phase of mechanical working (referred to as "productive" phase) up to a lower temperature, typically of less than 110° C., for example between 40° C. and 100° C., finishing phase during which the crosslinking system is incorporated.

The process in accordance with the invention for preparing a rubber composition exhibiting an improved abrasion and cut resistance comprises the following stages:
  incorporating in a diene elastomer, during a first stage (referred to "non-productive" stage), at least a reinforcing filler and a plasticizing system, by kneading thermomechanically the whole, in one or more goes, until a maximum temperature of between 110° C. and 190° C. is reached; cooling the entire mixture to a temperature of less than 100° C.;
  subsequently incorporating, during a second stage (referred as "productive" stage), the crosslinking system;
  kneading everything until a maximum temperature of less than 110° C. is reached,
and it is characterized in that the said plasticizing system comprises:
  between 5 and 35 phr of an MES or TDAE oil;
  between 5 and 35 phr of a terpene/vinylaromatic copolymer (preferably terpene/stirene copolymer, in particular limonene/stirene copolymer) resin.

By way of example, the non-productive phase is carried out in a single thermomechanical stage during which, in a first step, all the necessary base constituents (diene elastomer, reinforcing filler and coupling agent, if necessary, plasticizing system) are introduced into an appropriate mixer, such as a normal internal mixer, followed, in a second step, for example after kneading for one to two minutes, by the other additives, optional additional covering agents or processing aids, with the exception of the crosslinking system. After cooling the mixture thus obtained, the crosslinking system is then incorporated in an external mixer, such as an open mill, maintained at low temperature (for example, between 40° C. and 100° C.). The whole is then mixed (productive phase) for a few minutes, for example between 2 and 15 min.

The crosslinking system is preferably a vulcanization system based on sulphur and on an accelerator. Use may be made of any compound capable of acting as accelerator of the vulcanization of diene elastomers in the presence of sulphur, in particular those chosen from the group consisting of 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-tert-butyl-2-benzothiazolesulphenamide (abbreviated to "TBBS"), N-tert-butyl-2-benzothiazolesulphenimide (abbreviated to "TBSI") and the mixtures of these compounds. Preferably, a primary accelerator of the sulphenamide type is used.

Additional to this vulcanization system are various known secondary accelerators or vulcanization activators, such as zinc oxide, stearic acid, guanidine derivatives (in particular diphenylguanidine), and the like, incorporated during the first non-productive phase and/or during the productive phase. In the case of use of the composition of the invention as tire tread, the level of sulphur is, for example, between 0.5 and 3.0 phr and that of the primary accelerator is between 0.5 and 5.0 phr.

The final composition thus obtained can subsequently be calandered, for example in the form of a film or a sheet, or else extruded, for example to form a rubber profiled element used for the manufacture of a tire semi-finished product, such as treads, plies or other strips, underlayers, various rubber blocks, which may or may not be reinforced with textile or metal reinforcing elements, intended to form a part of the structure of the tire, very particularly its tread.

The vulcanization (or curing) can subsequently be carried out in a known way at a temperature generally of between 130° C. and 200° C., preferably under pressure, for a sufficient time which can vary, for example, between 5 and 90 min depending in particular on the curing temperature, the vulcanization system adopted and the vulcanization kinetics of the composition under consideration.

The invention relates to the rubber compositions described above both in the "raw" state (i.e., before curing) and in the "cured" or vulcanized state (i.e., after vulcanization).

Tests on Cut and Chipping Resistance

A composition according to the invention (recorded below as C-3) was compared with two control compositions (recorded as C-1 and C-2), the three compositions tested being identical, apart from the differences which follow:
  C-1: control according to the prior art with aromatic oil (37 phr);
  C-2: control with MES oil alone (31.5 phr);
  C-3: composition with plasticizing system according to the invention (combination of 12 phr of MES oil and of 19.5 phr of limonene/stirene copolymer resin).

These three compositions, with the exception of their plasticizing system, have a normal formulation for a rubber composition for a tire tread, namely, essentially, a mixture of diene elastomers (SSBR 70 phr/BR 30 phr), silica (78 phr), carbon black (4 phr) and a vulcanization system. The compositions C-1 and C-2 were formulated with the same volume of plasticizing oil. In the composition C-3, approximately ⅔ (i.e., 19.5 phr) of MES oil were replaced by the limonene/stirene resin (19.5 phr) synthesized above, in comparison with the control composition C-2.

The three compositions were tested as treads of radial carcass passenger vehicle tires, with a size of 195/65 R15 (speed index H), conventionally manufactured and in all respects identical apart from the constituent rubber composition of the tread. These tires are recorded respectively as P-1, P-2 and P-3; they were fitted to a passenger vehicle (Citroën model "C5" vehicle—front and rear pressure: 2.2 bar—tires tested fitted at the front of the vehicle—ambient temperature 25° C.) in order to be subjected to an endurance test which makes it possible to assess the cut and chipping resistance of the rubber compositions.

The test was carried out at a moderate running rate (less than 60 km/h), on two successive circuits:
  a first running on a circuit made of stony (stones with a large particle size) beaten earth intended to weaken the tread in the form of cuts and other surface attacks on the constituent rubber slabs of its tread pattern;

a second running on a very convoluted tarred circuit intended to "reveal" the chipping as a result of pieces of rubber being torn off (in the form of scales) along the weakened planes.

On conclusion of the running test, the condition of the treads is evaluated, on the one hand visually (photographs), by the assigning of a grade (according to a scale of seriousness from 1 to 10), on the other hand by the measurement of the loss in weight. The chipping resistance is finally assessed by a relative overall grade (base 100 with respect to a reference product).

While the conventional properties of the compositions, before and after curing, are substantially identical, the test on chipping resistance alone demonstrates all the advantage of the composition according to the invention in comparison with the two control compositions.

The results are given in the table below, in relative units, the base 100 having been selected for the control tire P-1, the tread of which comprises the conventional aromatic oil (a value of greater than 100 indicates an improved performance with respect to the control of base 100):

TABLE

| Tires No.: | P-1 | P-2 | P-3 |
|---|---|---|---|
| Chipping resistance | 100 | 85 | 114 |

It is noted first of all that the replacement of the aromatic oil by the MES oil (tires P-2 compared with tires P-1) is reflected by an unexpected fall of 15% in the chipping resistance, which is altogether noteworthy and can be regarded as totally unacceptable for certain uses of the tires.

In contrast, the replacement of a portion of the MES oil by the terpene/stirene polymer resin is reflected, surprisingly, by a spectacular recovery in performance (+34% for the tires P-3 in comparison with the tires P-2), the resistance observed with regard to the tires P-3 of the invention even being better by 14% than that of the tires P-1 constituting the starting reference.

The invention claimed is:

1. A rubber composition based on at least diene elastomer, a reinforcing filler, plasticized system and a crosslinking system, wherein said plasticizing system comprises (phr=parts by weight per hundred parts of elastomer):
   between 5 and 35 phr of an MES or TDAE oil; and
   between 5 and 35 phr of a limonene/styrene copolymer resin, and
   the level of units derived from styrene monomer being between 40% and 90% based on the weight of the copolymer resin.

2. The composition of claim 1, glass transition of temperature of the resin being greater than 25° C.

3. The composition of claim 2, the glass transition temperature of the resin being greater than 30° C.

4. The composition of claim 1, the number-average molecular weight of the resin being between 400 and 2000 g/mol.

5. The composition according to claim 1, the polymolecularity index of the resin being less than 3.

6. The composition according to claim 1, the level of copolymer resin being between 5 and 25 phr.

7. The composition according to claim 1, the level of MES or TDAE oil being between 10 and 30 phr.

8. The composition according to claim 1, the total plasticizing system level being between 15 and 45 phr.

9. The composition according to claim 1, the plasticizing system additionally comprising between 5 and 35 phr of a glycerol unsaturated ($C_{12}$-$C_{22}$) fatty acid triester.

10. The composition according to claim 9, the triester being a glycerol trioleate.

11. The composition according to claim 10, the glycerol trioleate being a sunflower or rapeseed vegetable oil.

12. The composition according to claim 9, the total plasticizing system level being between 20 and 70 phr.

13. The composition according to claim 1, the diene elastomer being chosen from the group consisting of polybutadienes, natural rubber, synthetic polyisoprenes, butadiene copolymers, isoprene copolymers and the blends of these elastomers.

14. The composition according to claim 1, the reinforcing filler being present at a level of between 20 and 200 phr.

15. A process for preparing a rubber composition exhibiting an improved abrasion and cut resistance, this composition being based on a diene elastomer, on a reinforcing filler, on a plasticizing system and on a crosslinking system, wherein the process comprises the steps of:
   incorporating in a diene elastomer, during a first "nonproductive" stage, at least a reinforcing filler and a plasticizing system, by kneading thermomechanically the whole, in one or more times, until a maximum temperature of between 110° C. and 190° C. is reached;
   cooling the entire mixture to a temperature of less than 100°;
   subsequently incorporating, during a second "productive" stage, the crosslinking system; and
   kneading everything until a maximum temperature of less than 110° C. is reached,
   wherein the plasticizing system comprises (phr=parts by weight per hundred parts of elastomer):
   between 5 and 35 phr of an MES or TDAE oil; and
   between 5 and 35 phr of a limonene/styrene copolymer resin and the level of units derived from styrene monomer being between 40% and 90% based on the weight of the copolymer resin.

16. A tire comprising a rubber composition according to claim 1.

17. A tire tread comprising a rubber composition according to claim 1.

18. A plasticizing system usable for the plasticizing of a diene rubber composition, comprising 1) an MES or TDAE oil; and 2) a resin formed of limonene/styrene copolymer wherein the plasticizing system comprises:
   between 5 and 35 phr of the MES or TDAE oil; and
   between 5 and 35 phr of the limonene/styrene copolymer resin, and the level of units derived from styrene monomer being between 40% and 90% based on the weight of the copolymer resin.

19. The plasticizing system according to claim 18, further comprising a glycerol unsaturated ($C_{12}$-$C_{22}$) fatty acid triester.

* * * * *